United States Patent [19]
Maruyama et al.

[11] Patent Number: 5,406,793
[45] Date of Patent: Apr. 18, 1995

[54] TRANSMISSION AND CONTROL MECHANISM FOR HYDROSTATIC-MECHANICAL POWER TRANSMISSION SYSTEM

[75] Inventors: Ryoichi Maruyama; Hideki Yamada; Tsutomu Ishino, all of Komatsu, Japan

[73] Assignee: Komatsu Ltd., Tokyo, Japan

[21] Appl. No.: 920,872

[22] Filed: Jul. 28, 1992

[30] Foreign Application Priority Data

Jul. 29, 1991 [JP] Japan .................. 3-188558

[51] Int. Cl.⁶ .............................. F16D 31/02
[52] U.S. Cl. ........................ 60/431; 60/437; 60/449; 475/76; 475/80
[58] Field of Search ........... 60/435, 437, 438, 431, 60/433, 449; 475/76, 80

[56] References Cited

U.S. PATENT DOCUMENTS

| | | | |
|---|---|---|---|
| 3,884,095 | 5/1975 | Miyao et al. ................ | 60/435 |
| 3,943,715 | 3/1976 | Mivao et al. ................ | 60/431 |
| 4,019,404 | 4/1977 | Schauer ..................... | 60/437 |
| 4,246,806 | 3/1981 | Mizuno et al. ............. | 74/862 |
| 4,253,347 | 1/1981 | Reynolds et al. .......... | 74/687 |
| 4,895,049 | 1/1990 | Kita et al. . | |
| 4,983,149 | 1/1991 | Kita ........................... | 475/76 |

FOREIGN PATENT DOCUMENTS

| | | |
|---|---|---|
| 54-30358 | 3/1979 | Japan . |
| 54-35558 | 3/1979 | Japan . |
| 54-102456 | 8/1979 | Japan . |
| 55-17241 | 5/1980 | Japan . |
| 56-48752 | 11/1981 | Japan . |
| 62-31660 | 7/1987 | Japan . |

*Primary Examiner*—Edward K. Look
*Assistant Examiner*—F. Daniel Lopez
*Attorney, Agent, or Firm*—Senniger, Powers, Leavitt & Roedel

[57] ABSTRACT

A transmission and control mechanism for a hydrostatic-mechanical power transmission system, provided with a mechanical transmission driven through an input shaft connected to a engine, a hydrostatic transmission connected to the input shaft, and a differential unit for connecting an output shaft to the mechanical and hydrostatic transmissions. The hydrostatic transmission includes a swashplate type pump and motor, with at least one of the swashplates being variable in angle. There is an engine revolution speed sensor, a target motor speed ratio setting device for setting a target motor speed ratio based on whether the engine speed is above, below or within a predetermined speed range, and a swashplate angle controller for controlling the swashplates according to the target motor speed ratio.

12 Claims, 6 Drawing Sheets

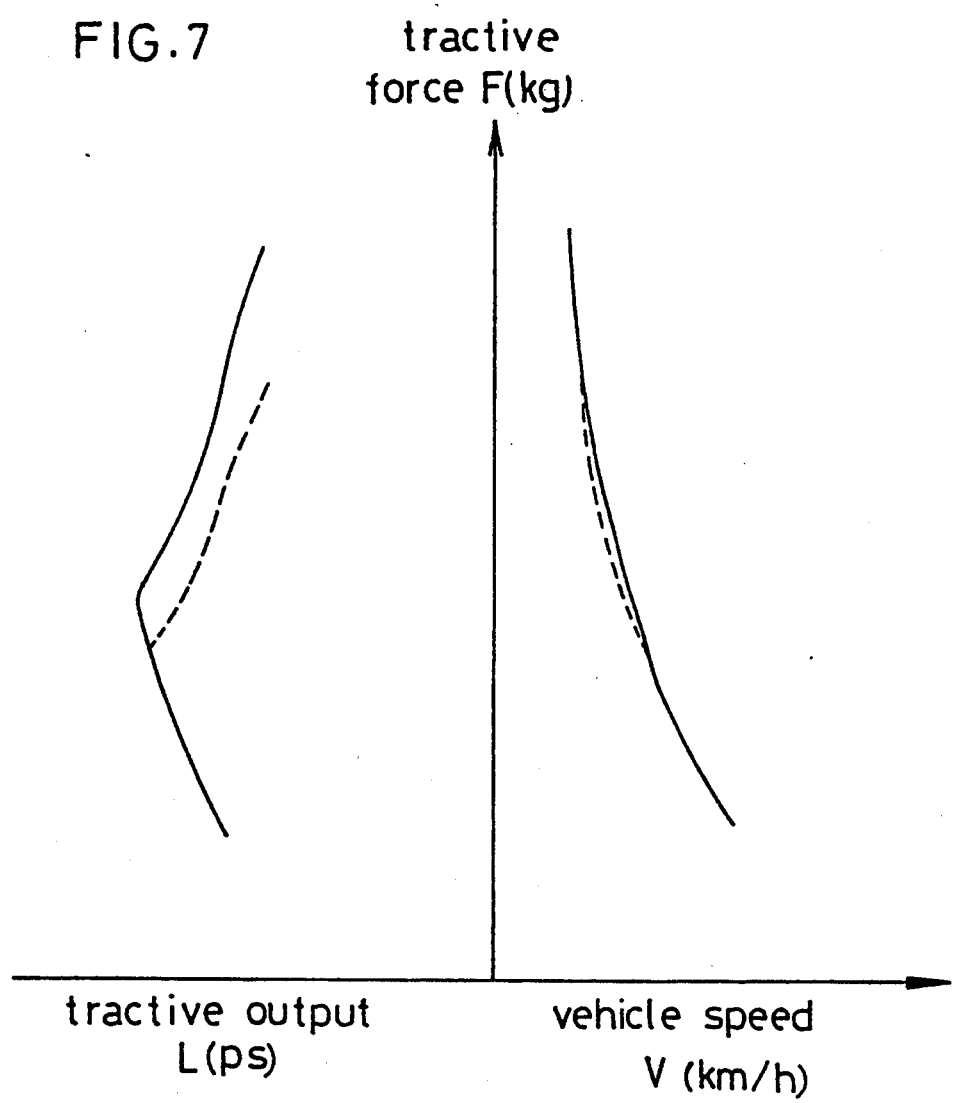

TRANSMISSION AND CONTROL MECHANISM FOR HYDROSTATIC-MECHANICAL POWER TRANSMISSION SYSTEM

BACKGROUND OF THE INVENTION

1. Field of the invention

The present invention relates to a transmission and control mechanism for a hydrostatic-mechanical power transmission system, provided with a mechanical transmission unit driven through an input shaft connectable to a power source; a hydrostatic transmission unit that is connectable to the input shaft and includes a pump and a motor each having a displacement setting swash plate, at least either of the displacement setting swash plates being variable in angle; and a differential unit for connecting an output shaft to the mechanical transmission unit and the hydrostatic transmission unit to drive. The invention, more particularly, relates to a transmission and control mechanism for a hydrostatic-mechanical power transmission system suitably provided in a track-laying vehicle such as bulldozers.

2. Description of the Prior Art

One proposal of a transmission and control mechanism for a hydrostatic-mechanical power transmission system of the above type is disclosed in Japanese Patent Publication No. 31660/1987. The control operation of the transmission and control mechanism for a hydrostatic-mechanical power transmission system in the above patent publication will be hereinbelow described.

A target revolution speed for the engine working as a power source is firstly obtained from throttle position, and then the deviation of the actual revolution speed of the engine from the target engine revolution speed is obtained. On the basis of the above deviation, the angle of the displacement setting swash plate of the pump disposed in the hydrostatic transmission unit is controlled, thereby making the actual engine revolution speed approach to the target engine revolution speed.

SUMMARY OF THE INVENTION

The tractive performance (vehicle speed V km/h·tractive output L ps-tractive force F kg) of a track-laying vehicle is dependent on the performance (revolution speed N rpm-Torque T kg.m) of the prime mover mounted on the track-laying vehicle and the performance of the transmission mechanism, that is, the performance of the hydrostatic-mechanical power transmission system (revolution speed ratio e-efficiency $\eta\%$). Concretely, among the factors of the tractive performance (vehicle speed V km/h·tractive output L ps-tractive force F kg) of the track-laying vehicle, the tractive output L that can be used as a guide for the amount of work to be done per hour is described by the following equation [Eq.1].

$$\begin{aligned} L &= 1/270 \cdot F \cdot V \\ &= 1/270 \, (T \cdot \eta/e \cdot R) \cdot (N \cdot e \cdot 2\pi R) \\ &= 2\pi/270 \cdot N \cdot T \cdot \eta \end{aligned} \quad [\text{Eq. 1}]$$

The performance of the hydrostatic-mechanical power transmission system (revolution speed ratio e-efficiency $\eta\%$) is as shown in FIG. 6: when the motor speed ratio $e_m$ is zero, the maximum values $\eta_{1\sim4}$ of the efficiency $\eta$ in the respective speed ranges (i.e., 2nd forward speed F2; 3rd forward speed F3; 2nd reverse speed R2; and 3rd reverse speed R3) can be achieved at revolution speed ratios $e_{01\sim04}$. In the respective speed ranges, the efficiency $\eta$ drops after peaking at the revolution speed ratios $e_{01\sim04}$. The efficiency $\eta$ particularly in the case of 2nd forward speed F2 at which dozing operation is often carried out, drops sharply as the revolution speed ratio decreases from the point $e_{01}$.

The mechanism in the above prior art adopts a so-called One-Point Adaptive Control Method wherein control operation is so performed as to make the actual revolution speed of the prime mover coincident with a target revolution speed. Therefore, it has disadvantages in that as understood from the above equation, only when the vehicle speed V corresponds to the revolution speed ratios $e_{01\sim04}$ at which the maximum efficiencies $\eta_{1\sim4}$ can be attained, is a desired value for the tractive output L achieved, and when the vehicle speed V does not correspond to the revolution speed ratios $e_{01\sim04}$, the efficiency $\eta$ drops sharply together with the tractive output L, resulting in bad tractive performance.

In order to overcome the above problem, the prime object of the present invention is to provide a transmission and control mechanism for a hydrostatic-mechanical power transmission system to be mounted on a track-laying vehicle such as bulldozers, the mechanism being capable of providing better tractive performance so that fuel cost for doing a certain amount of work can be reduced and the amount of work to be done within a given length of operating time can be increased.

In order to accomplish the above object, the transmission and control mechanism for a hydrostatic-mechanical power transmission system of the invention provided, as shown in the block diagram of FIG. 1 illustrating the structural principle, with a mechanical transmission unit having an input shaft connectable to an engine, said input shaft driving said mechanical transmission unit, a hydrostatic transmission unit connectable to and driven the input shaft and including a pump and a motor each having a displacement setting swash plate, at least either of the displacement setting swash plates being variable in angle, and a differential unit for connecting an output shaft to the mechanical transmission unit and the hydrostatic transmission unit to drive, a load comprises:

(a) means for setting a predetermined revolution speed range for the engine defined by a low revolution speed which is a lower limit and a high revolution speed which is an upper limit;

(b) revolution speed range sensing means for sensing whether an actual engine revolution speed is above, below or within the predetermined revolution speed range;

(c) target engine revolution speed setting means, responsive to said revolution speed range sensing means, for setting a target engine revolution speed at the low revolution speed when the actual engine revolution speed as sensed by the sensing means is below the low revolution speed and for setting the target engine revolution speed at the high revolution speed when the actual engine revolution speed is above the high revolution speed;

(d) target motor speed ratio setting means, responsive to said revolution speed range sensing means, for setting to zero or a value approximate to zero a target motor speed ratio that is a target value for the ratio of the revolution speed of the motor in the hydrostatic transmission unit to the actual engine revolution speed, when the revolution speed range sensing means senses that the actual engine revolution speed is within the predetermined revolution speed range; and (e) swash plate angle control means for controlling at least either of the angles of the displacement setting swash plates according to the target engine revolution speed set by the target engine revolution speed setting means when the actual engine revolution speed is outside the range or according to the target motor speed ratio set by the target motor speed ratio setting means when the actual engine revolution speed is within the range whereby the mechanism compensates for changes in the actual engine revolution speed due to changes in load so that the target engine revolution speed is at the low revolution speed when the actual revolution speed is below the range, so that the target motor speed ratio is at zero or a value approximate to zero when the actual engine revolution speed is within the range and so that the target engine revolution speed is at the high revolution speed when the actual engine revolution speed is above the high revolution speed.

In the above mechanism, on the basis of the sensing operation of the revolution speed range sensing means (1) in which it senses that the actual revolution speed of the power source has dropped from a target revolution speed to a value within a predetermined revolution speed range because of loads, the target motor speed ratio setting means (2) sets the target motor speed ratio to a specified value approximate to zero or zero at which high efficiency can be achieved in the transmission mechanism. Then, the swash plate angle control means (3) controls at least either of the angles of the displacement setting swash plates, the control amount of which is based on the motor speed ratio set to zero or a specified value approximate to zero.

In other words, when the actual revolution speed of the power source decreases, because of loads, from a target revolution speed to a value within a predetermined revolution speed range, the motor speed ratio in the transmission mechanism is maintained at a specified value approximate to zero or zero at which the transmission mechanism shows high efficiency and the actual revolution speed is allowed to vary within the predetermined revolution speed range, whereby the tractive performance can be improved without employing the One-Point Adaptive Control wherein the actual revolution speed of the power source is adjusted to a target revolution speed.

With the above arrangement, when the actual revolution speed of the power source drops, owing to loads, from a target fuel-efficient revolution speed, the revolution speed of the power source is allowed to vary while the motor speed ratio being kept at a value at which the transmission mechanism shows high efficiency. This enables higher tractive performance than prior art, as understood from FIG. 7 which is used in the description of the embodiment. As a result, by equipping a tracklaying vehicle such as bulldozers with the mechanism of the invention, it is possible to achieve improved tractive performance so that fuel cost for doing a certain amount of work can be reduced and the amount of work to be done within a given length of operating time can be increased.

Preferably, the aforesaid predetermined revolution speed range has a lower limit equal to the limit of revolution speed at which the power source can normally revolves. It is also preferable that the mechanical transmission unit comprises a transmission for providing a plurality of speed ranges and the setting of the target motor speed ratio to zero or a value approximate to zero by means of the target motor speed ratio setting means (2) is carried out at least when the transmission is in second forward speed.

It is preferable that the target motor speed ratio setting means (2) comprises:

(a) throttle position detecting means for detecting the position of a throttle;

(b) target engine revolution speed calculating means for calculating the target engine revolution speed, based on the detected throttle position;

(c) motor speed ratio-revolution speed ratio converting means for converting an actual motor speed ratio into an actual revolution speed ratio, the actual motor speed ratio being the ratio of the actual motor revolution speed to an actual engine revolution speed, and the actual revolution speed ratio being the ratio of the revolution speed of the output shaft to the engine revolution speed;

(d) target revolution speed ratio calculating means for calculating a target revolution speed ratio that is a target value for the ratio of the revolution speed of the output shaft to the actual engine revolution speed, the target engine revolution speed obtained by the target engine revolution speed calculating means and the actual revolution speed ratio obtained from the conversion by the motor speed ratio-revolution speed ratio converting means; and (e) target revolution speed ratio-target motor speed ratio converting means for converting the target revolution speed ratio calculated by the target revolution speed ratio calculating means into the target motor speed ratio.

Alternatively, the target motor speed ratio setting means comprises:

(a) throttle position detecting means for detecting the position of a throttle;

(b) target engine revolution speed calculating means for calculating the target engine revolution speed, based on the detected throttle position;

(c) target revolution speed ratio calculating means for calculating a target revolution speed ratio that is a target value for the ratio of the revolution speed of the output shaft to the actual engine revolution speed, wherein the target revolution speed ratio is obtained from the target engine revolution speed calculated by the target engine revolution speed calculating means, the actual engine revolution speed and a preceding target revolution speed ratio calculated prior to said target revolution speed ratio; and (d) target revolution speed ratio-target motor speed ratio converting means for converting the target revolution speed ratio calculated by the target revolution speed ratio calculating means into the target motor speed ratio.

The above calculation of the target revolution speed of the power source executed by means of the target revolution speed calculating means based on throttle position may be performed with a specified characteristic functional equation or table.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2 through 7 are diagrams illustrating an embodiment of the transmission and control mechanism for a hydrostatic-mechanical power transmission system according to the invention;

FIG. 2 is a block diagram of the whole structure of the mechanism;

FIG. 3 is a graph showing the relationship between revolution speed ratio and motor speed ratio;

FIG. 4 is a block diagram showing arithmetic operation performed in a controller section;

FIG. 5 shows the performance of an engine in the embodiment;

FIG. 6 shows the performance of the hydrostatic-mechanical power transmission system in the embodiment; and FIG. 7 shows the tractive performance achieved by the embodiment.

DESCRIPTION OF THE PREFERRED EMBODIMENT

Reference is now made to the drawings for describing a transmission and control mechanism for a hydrostatic-mechanical power transmission system according to an embodiment of the invention.

Figure 2:
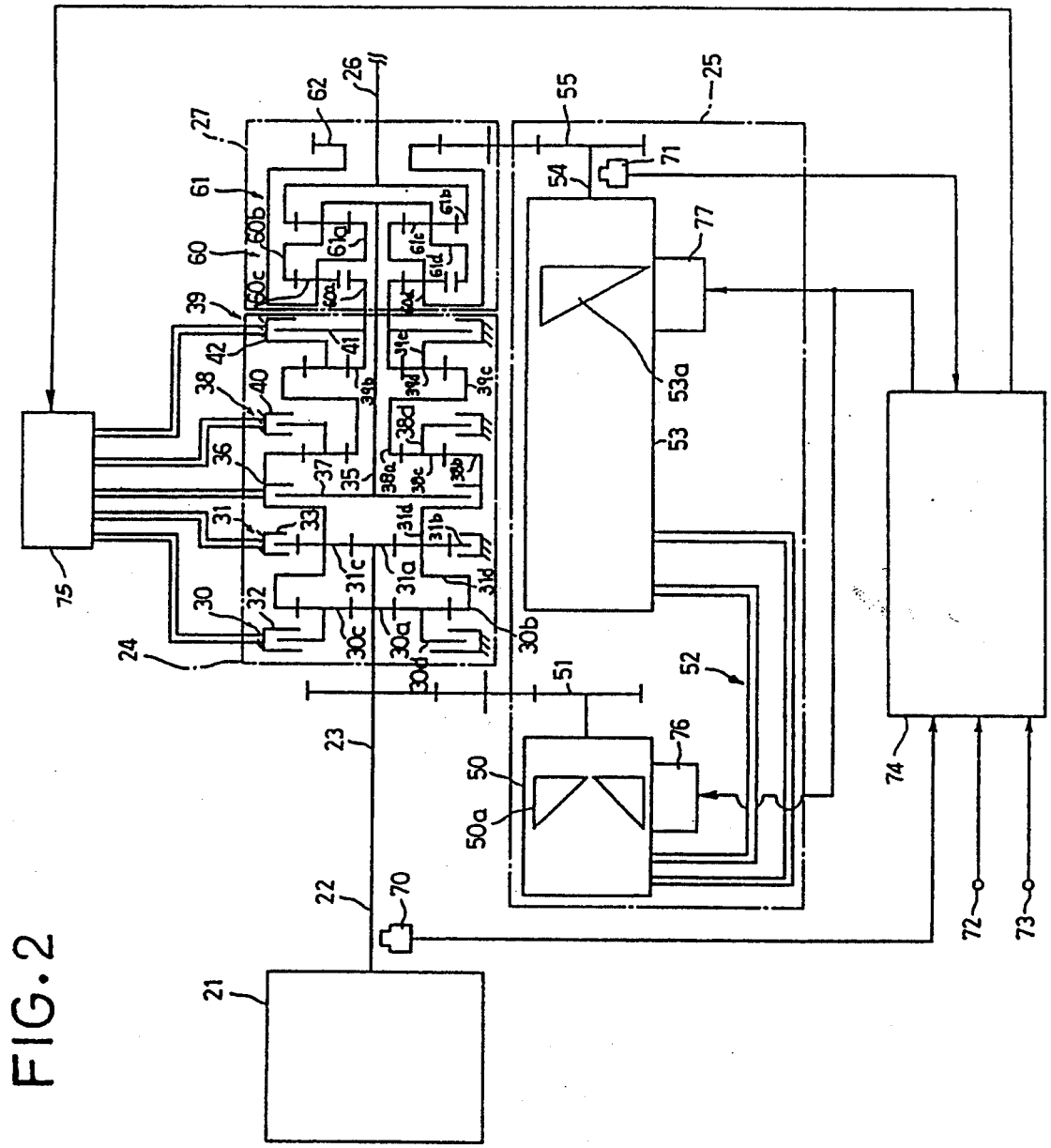

In FIG. 2, there is provided an input shaft 23 connected coaxially to an output shaft 22 of an engine 21 which is employed as one example of the power source of the system according to the invention. The input shaft 23 is connected to a mechanical transmission unit 24 having a transmission and a hydrostatic transmission unit 25 having a hydraulic pump-motor so that power transmitted from the engine 21 is split, providing three forward speeds and three reverse speeds. There is also provided a differential unit 27 that connects an output shaft 26 selectively to both the mechanical transmission unit 24 and the hydrostatic transmission unit 25, or to the hydrostatic transmission unit 25 only, for driving.

The mechanical transmission unit 24, the hydrostatic transmission unit 25 and the differential unit 27 will be hereinafter described in order.

(1) Mechanical transmission unit 24

In FIG. 2, the input shaft 23 is provided with a reverse planetary gear train 30 and a forward planetary gear train 31. The gear trains 30 and 31 are of the single planetary type and are aligned in an axial direction of the input shaft 23 in this order when enumerating from the left. The reverse planetary gear train 30 is composed of a sun gear 30a fixedly attached to the input shaft 23; a ring gear 30b positioned outside the sun gear 30a; a planet gear 30c which is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a fixedly attached to the input shaft 23; a ring gear 31b which is positioned outside the sun gear 31a and can be hydraulically braked by a forward hydraulic clutch 33; a planet gear 31c which is in mesh with the gears 31a and 31b, being positioned therebetween; a planet carrier 31d that is for the planet gear 31c and is integral with the ring gear 30b of the reverse planetary gear train 30.

There is provided an intermediate shaft 35 positioned coaxially with and in an extending direction of the input shaft 23. In FIG. 2, the intermediate shaft 35 is provided, at the left end thereof, with a clutch board 37 that is hydraulically connectable by a 2nd-speed hydraulic clutch 36. The 2nd-speed hydraulic clutch 36 is formed integrally with the planet carrier 31d of the forward planetary gear train 31. The intermediate shaft 35 is also provided with a first 3rd-speed planetary gear train 38 and a second 3rd-speed planetary gear train 39. The gear trains 38 and 39 are of the single planetary type and are aligned in an axial direction of the intermediate shaft 35 in this order when enumerating from the left in FIG. 2.

The first 3rd-speed planetary gear train 38 is composed of a sun gear 38a rotatably supported by the intermediate shaft 35; a ring gear 38b which is positioned outside the sun gear 38a, being integral with the planet carrier 31d of the forward planetary gear train 31 and the 2nd-speed hydraulic clutch 36; a planet gear 38c which is in mesh with the gears 38a and 39b, being positioned therebetween; and a planet carrier 38d that is for the planet gear 38c and can be hydraulically braked by a 3rd-speed hydraulic clutch 40. Similarly, the second 3rd-speed planetary gear train 39 is composed of a sun gear 39b which is rotatably supported by the intermediate shaft 35, being integral with a clutch board 41; a ring gear 39c which is positioned outside the sun gear 39b, being integral with the sun gear 38a of the first 3rd-speed planetary gear train 38; a planet gear 39d which is in mesh with the gears 39b and 39c, being positioned therebetween; and a fixed planet carrier 39e that is for the planet gear 39d and is integral with a 1st-speed hydraulic clutch 42 for hydraulically connecting the clutch board 41.

(2) Hydrostatic transmission unit 25

The input shaft 23 is coupled through a gear train 51 to a variable displacement pump 50 having a displacement setting variable-angle swash plate 50a which swings both in the positive and negative directions. The variable displacement pump 50 is connected, through a pair of conduits 52 consisting of an outgoing path and a return path, to a variable displacement motor 53 having a displacement setting variable-angle swash plate 53a which swings in one direction. An output shaft 54 of the variable displacement motor 53 is connected to a gear train 55. The displacement setting variable-angle swash plates 50a and 53a provided in the variable displacement pump 50 and the variable displacement motor 53 are arranged such that the revolution speed of the variable displacement pump 50 and that of the variable displacement motor 53 vary according to the variations of the angles of the displacement setting variable-angle swash plates 50a and 53a, as described below.

The revolution speed of the variable displacement pump 50 is specified, and the displacement setting variable-angle swash plate 53a of the variable displacement motor 53 is inclined at a maximum tilt angle. In the above condition, as the displacement setting variable-angle swash plate 50a of the variable displacement pump 50 is inclined from zero in the positive direction, the revolution speed of the variable displacement motor 53 increases from zero in the positive direction. Then, the tilt angle of the displacement setting variable-angle swash plate 50a of the variable displacement pump 50 is set to a maximum positive value. In this condition, as the tilt angle of the displacement setting variable-angle swash plate 53a of the variable displacement motor 53 is decreased, the revolution speed of the variable displacement motor 53 further increases in the positive direction.

On the other hand, as the displacement setting variable-angle swash plate 50a of the variable displacement pump 50 is inclined from zero in the negative direction in condition that the displacement setting variable-angle swash plate 53a of the variable displacement motor 53 is inclined at a maximum tilt angle, the revolution speed of the variable displacement motor 53 increases from zero in the negative direction. Then, the tilt angle of the displacement setting variable-angle swash plate 50a of the variable displacement pump 50 is set to a maximum negative value. In this condition, as the tilt angle of the displacement setting variable-angle swash plate 53a of the variable displacement motor 53 is decreased, the revolution speed of the variable displacement motor 53 further increases in the negative direction.

(3) Differential unit 27

In FIG. 2, the intermediate shaft 35 is provided, at the right end, with a first differential planetary gear train 60 of the double planetary type and a second differential planetary gear train 61 of the single planetary type. These gear trains 60 and 61 are aligned coaxially with and in an extending direction of the intermediate shaft 35 in this order when enumerating from the left. The first differential planetary gear train 60 is composed of a sun gear 60a which is rotatably supported by the intermediate shaft 35, being integral with the sun gear 39b of the second 3rd-speed planetary gear train 39 and the clutch board 41; one ring gear 60b positioned outside the sun gear 60a; a planet gear 60c which is in mesh with the other of the ring gears 60b; and a planet carrier 60d that is for the planet gear 60c and is integral with an input gear 62 connected through the gear train 55 to the output shaft 54 of the variable displacement motor 53 in the hydrostatic transmission unit 25. Similarly, the second differential planetary gear train 61 is composed of a sun gear 61a which is rotatably supported by the intermediate shaft 35, being integral with the planet carrier 60d of the first differential planetary gear train 60; a ring gear 61b which is positioned outside the sun gear 61a, being integral with the output shaft 26 positioned (at the right hand in FIG. 2) coaxially with and in an extending direction of the intermediate shaft 35; a planet gear 61c which is in mesh with the gears 61a and 61b, being positioned therebetween; and a planet carrier 61d that is for the planet gear 61c and is integral with the ring gear 60b of the first differential planetary gear train 60 and the intermediate shaft 35.

Figure 1:
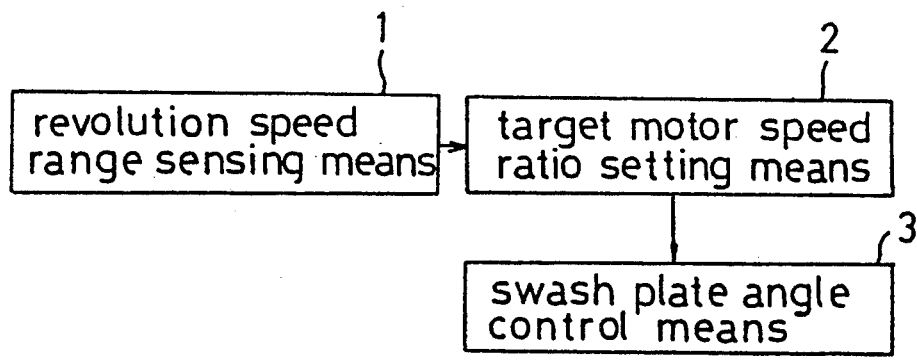
FIG. 1 is a block diagram illustrating the structural principle of a transmission and control mechanism for a hydrostatic-mechanical power transmission system according to the invention.
Figure 3:
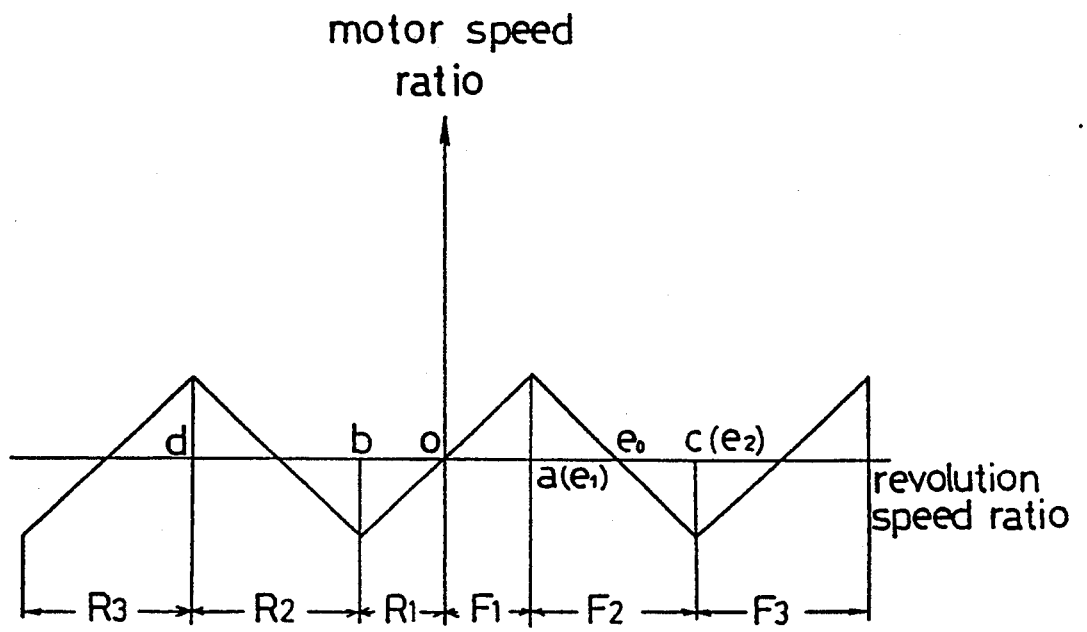

There will be given an explanation on the mechanical operations of the mechanical transmission unit 24, the hydrostatic transmission unit 25 and the differential unit 27. FIG. 3 shows the relationship between revolution speed ratio (i.e., the ratio of the revolution speed of the output shaft 26 to the revolution speed of the output shaft 22 of the engine 21 (=the revolution speed of the engine)) and motor speed ratio (i.e., the ratio of the revolution speed of the output shaft 54 of the variable displacement motor 53 (=the revolution speed of the motor) to the revolution speed of the output shaft 22 of the engine 21 (=the revolution speed of the engine)) in the respective speed ranges (i.e., 1st forward speed; 2nd forward speed F2; 3rd forward speed F3; 1st reverse speed R1; 2nd reverse speed R2; and 3rd reverse speed R3).

(i) 1st forward speed F1 and 1st reverse speed R1:

Only the 1st-speed hydraulic clutch 42 is engaged. The engagement of the clutch 42 causes the sun gear 60a of the first differential planetary gear train 60 to be hydraulically braked through the clutch board 41 and the intermediate shaft 35 to be in a freely rotated state. Accordingly, only the torque of the variable displacement hydraulic motor 53 in the hydrostatic transmission unit 25 is transmitted to the output shaft 54 of the variable displacement hydraulic motor 53; the gear train 55; the input gear 62, the planet carrier 60d, the planet gear 60c and the ring gear 60b of the first differential planetary gear train 60, the planet carrier 61d, the planet gear 61c and the ring gear 61b of the second differential gear train 61 in the differential unit 27; and the output shaft 26 in this order. In short, the output shaft 26 is driven, being connected only to the hydrostatic transmission unit 25 by means of the differential unit 27.

As the motor speed ratio is thus increased from zero in the positive direction, the revolution speed of the output shaft 26 increases from zero in the positive direction. On the other hand, as the motor speed ratio decreases from zero in the negative direction, the revolution speed of the output shaft 26 also increases from zero in the negative direction. Thus, the revolution speed ratio is infinitely varied both in the positive and negative directions within a specified range.

In 1st forward speed F1 and 1st reverse speed R1, neither the forward hydraulic clutch 33 nor the reverse hydraulic clutch 32 may be engaged, or alternatively, either of them may be engaged. However, when taking into account the case that the speed may be shifted to 2nd forward speed F2 or 2nd reverse speed R2 by changing the clutches, it is preferable that the forward hydraulic clutch 33 is engaged at the time of forward drive and the reverse hydraulic clutch 32 is engaged at the time of reverse drive.

In 1st speed, when the revolution speed of the output shaft 26 increases in the positive direction and the revolution speed ratio is a specified positive value a, the relative revolution speed of the 2nd-speed hydraulic clutch 36 in relation to the clutch board 37 becomes zero. In this condition, if the 2nd-speed hydraulic clutch 36 is engaged and the 1st-speed hydraulic clutch 42 is disengaged, 2nd forward speed F2 will be obtained. At that time, the forward hydraulic clutch 33 has been engaged.

In 1st speed, when the revolution speed of the output shaft 26 increases in the negative direction and the revolution speed ratio is a specified negative value b, the relative revolution speed of the 2nd-speed hydraulic clutch 36 in relation to the clutch board 37 becomes zero. In this condition, if the 2nd-speed hydraulic clutch 36 is engaged and the 1st-speed hydraulic clutch 42 is disengaged like the above case, 2nd reverse speed R2 will be obtained. At that time, the reverse hydraulic clutch 32 has been engaged.

(ii) Second forward speed F2

Since the clutch board 37 is hydraulically connected by the engagement of the 2nd-speed hydraulic clutch 36 and the ring gear 31b of the forward planetary gear train 31 is hydraulically braked by the engagement of the forward hydraulic clutch 33, the torque of the input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. As the torque is transmitted, the revolution speed of the input shaft 23 decreases. The torque of the variable displacement motor 53 in the hydrostatic transmission unit 25 is also transmitted to the output shaft 54 of the variable displacement motor 53, the gear train 55, the input gear 62, the planet carrier 60d of the first differential planetary gear train 60 and then to the second differential planetary gear train 61 in the differential unit 27, while the revolution speed is being reduced. The second differential planetary gear train 61 connects the mechanical transmission unit 24 and the hydrostatic transmission unit 25, whereby their revolution speeds are combined to drive the output shaft 26.

Thus, the motor speed ratio decreases thereby increasing the revolution speed of the output shaft 26 in the positive direction.

When the motor speed ratio is positive in 2nd forward speed F2, part of torque from the second differential planetary gear train 61 in the differential unit 27 flows backwardly to the input gear 62 through the planet gear 61c, the sun gear 61a of the second differential planetary gear train 61 and the first differential planetary gear train 60 so that the variable displacement motor 53 performs its pumping operation. The pumping operation of the variable displacement motor 53 causes the variable displacement pump 50 to be driven, and the torque of the variable displacement pump 50 is transmitted through the gear train 51 to the input shaft 23 where the torque is combined with the torque of the engine 21.

When the motor speed ratio is negative on the other hand, part of the torque of the input shaft 23 drives the variable displacement pump 50 through the gear train 51. The drive of the variable displacement pump 50 actuates the variable displacement motor 53 whose torque is transmitted to the gear train 55, the input gear 62 etc. in the differential unit 27, and then to the second differential planetary gear train 61 in the differential unit 27. At the second differential planetary gear train 61, the transmitted torque is combined with torque from the mechanical transmission unit 24 to drive the output shaft 26.

In 2nd forward speed F2, when the revolution speed ratio is increased to a specified value c, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd forward speed F3 will be obtained.

In 2nd forward speed F2, when the revolution speed ratio decreases from a higher value to the specified value a, the relative revolution speed of the 1st-speed hydraulic clutch 42 in relation to the clutch board 41 becomes zero. In this condition, if the 1st-speed hydraulic clutch 42 is engaged and the 2nd-speed hydraulic clutch 36 is disengaged, 1st forward speed F1 will be obtained.

(iii) 3rd forward speed F3

Since the planet carrier 38d of the first 3rd-speed planetary gear train 38 is hydraulically braked by the engagement of the 3rd-speed hydraulic clutch 40 and the ring gear 31b of the forward planetary gear train 31 is hydraulically braked by the engagement of the forward hydraulic clutch 33, the torque of the input shaft 23 is transmitted through the forward planetary gear train 31, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, whilst the revolution speed being reduced. The torque of the variable displacement motor 53 in the hydrostatic transmission unit 25 is transmitted through the output shaft 54 of the variable displacement motor 53 and the gear train 55 to the first and second differential planetary gear trains 60 and 61 in the differential unit 27, whilst the revolution speed being reduced. The first and second differential planetary gear trains 60 and 61 connect the mechanical transmission unit 24 and the hydrostatic transmission unit 25, whereby their revolution speeds are combined to drive the output shaft 26.

As the motor speed ratio is thus increased, the revolution speed of the output shaft 26 increases in the positive direction.

When the motor speed ratio is negative in 3rd forward speed F3, part of torque from the first and second differential planetary gear trains 60 and 61 in the differential unit 27 flows backwardly to the input gear 62 so that the variable displacement motor 53 performs its pumping operation and the torque of the variable displacement motor 53 is transmitted, as described above, through the variable displacement pump 50 and the gear train 51 to the input shaft 23 where the torque is combined with the torque of the engine 21.

When the motor speed ratio is positive on the other hand, part of the torque of the input shaft 23 drives the variable displacement pump 50 through the gear train 51, and the torque of the variable displacement motor 53 is transmitted, as described above, through the gear train 55 and the input gear 62 etc. in the differential unit 27 to the first and second differential planetary gear trains 60 and 61 in the differential unit 27. At the first and second differential planetary gear trains 60 and 61, the torque is combined with torque from the mechanical transmission unit 24 to drive the output shaft 26.

In 3rd forward speed F3, when the revolution speed ratio decreases from a higher value to the specified value c, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd forward speed F2 will be obtained.

(iv) 2nd reverse speed R2

Since the clutch board 37 is hydraulically connected by the engagement of the 2nd-speed hydraulic clutch 36 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, whilst the revolution speed being reduced. The torque of the variable displacement motor 53 in the hydrostatic transmission unit 25 is transmitted, as described above, through the output shaft 54 of the variable displacement motor 53, the gear train 55, the input gear 62 and the planet carrier 60d of the first differential planetary gear train 60 in the differential unit 27 to the second differential planetary gear train 61, whilst the revolution speed being reduced. The first differential planetary gear train 61 connects the mechanical transmission unit 24 and the hydrostatic transmission unit 25 thereby combining their revolution speeds to drive the output shaft 26.

As the motor speed ratio is increased accordingly, the revolution speed of the output shaft 26 increases in the negative direction.

In 2nd reverse speed R2, when the motor speed ratio is negative, part of torque from the second differential planetary gear train 61 in the differential unit 27 flows backwardly to the hydrostatic transmission unit 25 so that the variable displacement motor 53 performs its pumping operation. When the motor speed ratio is positive, the operation to be carried out is the same as that described in the case of 2nd forward speed F2, except that the partial flow of the torque of the input shaft 23 toward the hydrostatic transmission unit 25 occurs.

In 2nd reverse speed R2, when the revolution speed ratio decreases from a higher value to a specified value d, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd reverse speed R3 will be obtained.

When the revolution speed ratio is increased to the specified value b in 2nd reverse speed R2, the relative revolution speed of the 1st-speed hydraulic clutch 42 in relation to the clutch board 41 becomes zero. In this condition, if the 1st-speed hydraulic clutch 42 is engaged and the 2nd-speed hydraulic clutch 36 is disengaged, 1st reverse speed R1 will be obtained.

(v) 3rd reverse speed R3

Since the planet carrier 38d of the first 3rd-speed planetary gear train 38 is hydraulically braked by the engagement of the 3rd-speed hydraulic clutch 40 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed is being reduced. Also, the torque of the variable displacement motor 53 in the hydrostatic transmission unit 25 is transmitted, as described above, through the output shaft 54 of the variable displacement motor 53 and the gear train 55 to the first and second differential planetary gear trains 60 and 61 in the differential unit 27, while the revolution speed being reduced. The first and second differential planetary gear trains 60 and 61 connect the mechanical transmission unit 24 and the hydrostatic transmission unit 25 thereby combining their revolution speeds to drive the output shaft 26.

As the motor speed ratio is decreased accordingly, the revolution speed of the output shaft 26 increases in the negative direction.

In 3rd reverse speed R3, when the motor speed ratio is positive, part of torque from the first and second differential planetary gear trains 60 and 61 in the differential unit 27 flows backwardly to the hydrostatic transmission unit 25 so that the variable displacement motor 53 performs its pumping operation. When the motor speed ratio is negative, the operation to be carried out is the same as that described in the case of 3rd forward speed F3, except that the partial flow of the torque of the input shaft 23 toward the hydrostatic transmission unit 25 occurs.

In 3rd reverse speed R3, when the revolution speed ratio is increased to the specified value d, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd reverse speed R2 will be obtained.

The control operation for the mechanical transmission unit 24 and the hydrostatic transmission unit 25 will be explained hereinbelow.

In FIG. 2, the output shaft 22 of the engine 21 is provided with an engine revolution speed detector 70 for detecting the revolution speed of the output shaft 22 to detect the revolution speed $n_E$ of the engine 21, and the output shaft 54 of the variable displacement motor 53 in the hydrostatic transmission unit 25 is provided with a motor revolution speed detector 71 for detecting the revolution speed $n_m$ of the variable displacement motor 53 as well as the direction of revolution. An engine throttle (not shown) is provided with a throttle position detector 72 for detecting the position X of the engine throttle. A change lever (not shown) is provided with a lever position detector 73 for detecting the position FNR (i.e., forward, neutral and reverse positions) of the change lever to be manipulated. The engine revolution speed detector 70, the motor revolution speed detector 71, the throttle position detector 72 and the lever position detector 73 issue an engine revolution speed signal, motor revolution speed signal, throttle position signal and lever position signal respectively to a controller section 74. The controller section 74 executes signal processing on the basis of those signals and issues a shift control signal to a shift valve 75 so that the engagements/disengagements of the reverse hydraulic clutch 32, the forward hydraulic clutch 33, the 2nd-speed hydraulic clutch 36, the 3rd-speed hydraulic clutch 40 and the 1st-speed hydraulic clutch 42 are carried out as described above. The controller section 74 also supplies an angle control signal to a change-angle valve 76 for the displacement setting variable-angle swash board 50a of the variable displacement pump 50 and to a change-angle valve 77 for the displacement setting variable-angle swash board 53a of the variable displacement motor 53 respectively.

As a target engine revolution speed $N_E$ of the engine 21 for the throttle position X of the engine throttle to be operated, there are given an engine revolution speed $N_H$ and an engine revolutions speed $N_L$. The engine speed $N_H$ is based on high fuel efficiency. The engine revolution speed $N_L$ is lower than the engine revolution speed $N_H$ but falls within the range wherein the engine 21 can revolve in a normal condition. Either of these revolution speeds $N_H$ and $N_L$ is selected as the target engine revolution speed $N_E$, according to a speed range selected and an actual engine revolution speed $n_E$ achieved when the vehicle is driven.

(1) when the speed range selected is 3rd forward speed F3, 1st reverse speed R1, 2nd reverse speed R2, or 3rd reverse speed R3:

target engine revolution speed $N_E \to$ engine revolution speed $N_H$ (2) when the speed range selected is 1st forward speed F1:

target engine revolution speed $N_E \to$ engine revolution speed $N_L$ (3) when the speed range selected is 2nd forward speed F2:

i) $n_E \geq N_H$ target engine revolution speed $N_E \to$ engine revolution speed $N_H$ ii) $n_E \leq N_L$ target engine revolution speed $N_E \to$ engine revolution speed $N_L$ (when $N_L < n_E < N_H$, neither the engine revolution speed $N_H$ nor $N_L$ is selected as the target engine revolution speed $N_E$, and the motor speed ratio is maintained constantly at zero so that the actual engine revolution speed $n_E$ is allowed to vary.)

The control direction of the revolution speed ratio, which corresponds to the lever position FNR of the change lever is determined.

Accordingly, the control of the revolution speed ratio is performed in the controller section 74 as shown in Table 1. This control operation is based on a speed range selected; the condition (positive or negative etc.) of the actual revolution speed ratio e; the relation between the actual engine revolution speed $n_E$ that is obtained from the engine revolution speed signal from the engine revolution speed detector 70 and the target engine revolution speed $N_E$ that is obtained from the throttle position signal from the throttle position detector 72 and also selected from the revolution speeds $N_H$ and $N_L$ as described above; and the lever position FNR indicated by the lever position signal from the lever position detector 73.

TABLE 1

| Selected speed | actual revolution speed ratio e | relation between target engine revolution speed $N_E$ ($N_H$, $N_L$) and actual engine revolution speed $n_E$ | lever position FNR | control of revolution speed ratio |
|---|---|---|---|---|
| F3 | $e > e_2$ | $n_E > N_H$ | forward | increase toward positive |
| | | $n_E = N_H$ | | keep constant |
| | | $n_E < N_H$ | | decrease toward zero |
| F2 | $e > e_0$ | $n_E > N_H$ | | increase toward positive |
| | | $n_E = N_H$ | | keep constant |
| | | $n_E < N_H$ | | decrease toward $e_0$ |
| | $e = e_0$ | $n_E$  $N_E$ (*) | | keep at $e_0$ |
| | $e < e_0$ | $n_E > N_L$ | | increase toward $e_0$ |
| | | $n_E = N_L$ | | keep constant |
| | | $n_E < N_L$ | | decrease toward zero |
| F1 | $0 < e < e_1$ | $n_E > N_L$ | | increase toward positive |
| | | $n_E = N_L$ | | keep constant |
| | | $n_E < N_L$ | | decrease toward zero |
| R1-R3 | $e < 0$ | $n_E$  $N_E$ (*) | | increase toward zero |
| F1-F3 | $e > 0$ | $n_E$  $N_E$ | neutral | decrease toward |

TABLE 1-continued

| Selected speed | actual revolution speed ratio e | relation between target engine revolution speed $N_E$ ($N_H$, $N_L$) and actual engine revolution speed $n_E$ | lever position FNR | control of revolution speed ratio |
|---|---|---|---|---|
| R1-R3 (*) | $e = 0$ | $n_E$  $N_E$ (*) | | zero keep at zero |
| | $e < 0$ | $n_E$  $N_E$ (*) | | increase toward zero |
| R1-R3 | $e \leq 0$ | $n_E > N_H$ | reverse | decrease toward negative |
| | $e < 0$ | $n_E < N_H$ | | increase toward zero |
| | $e = 0$ | $n_E < N_H$ | | keep at zero |
| | $e \leq 0$ | $n_E = N_H$ | | keep constant |
| F1-F3 | $e > 0$ | $n_E$  $N_E$ (*) | | decrease toward zero |

*all conditions

The reference numeral $e_1$ represents a revolution speed ratio corresponding to the specified value a in FIG. 3, the numeral $e_2$ represents a revolution speed ratio corresponding to the specified value c in FIG. 3, and the numeral $e_0$ represents a revolution speed ratio when the motor speed ratio is zero in 2nd forward speed F2.

Figure 4:
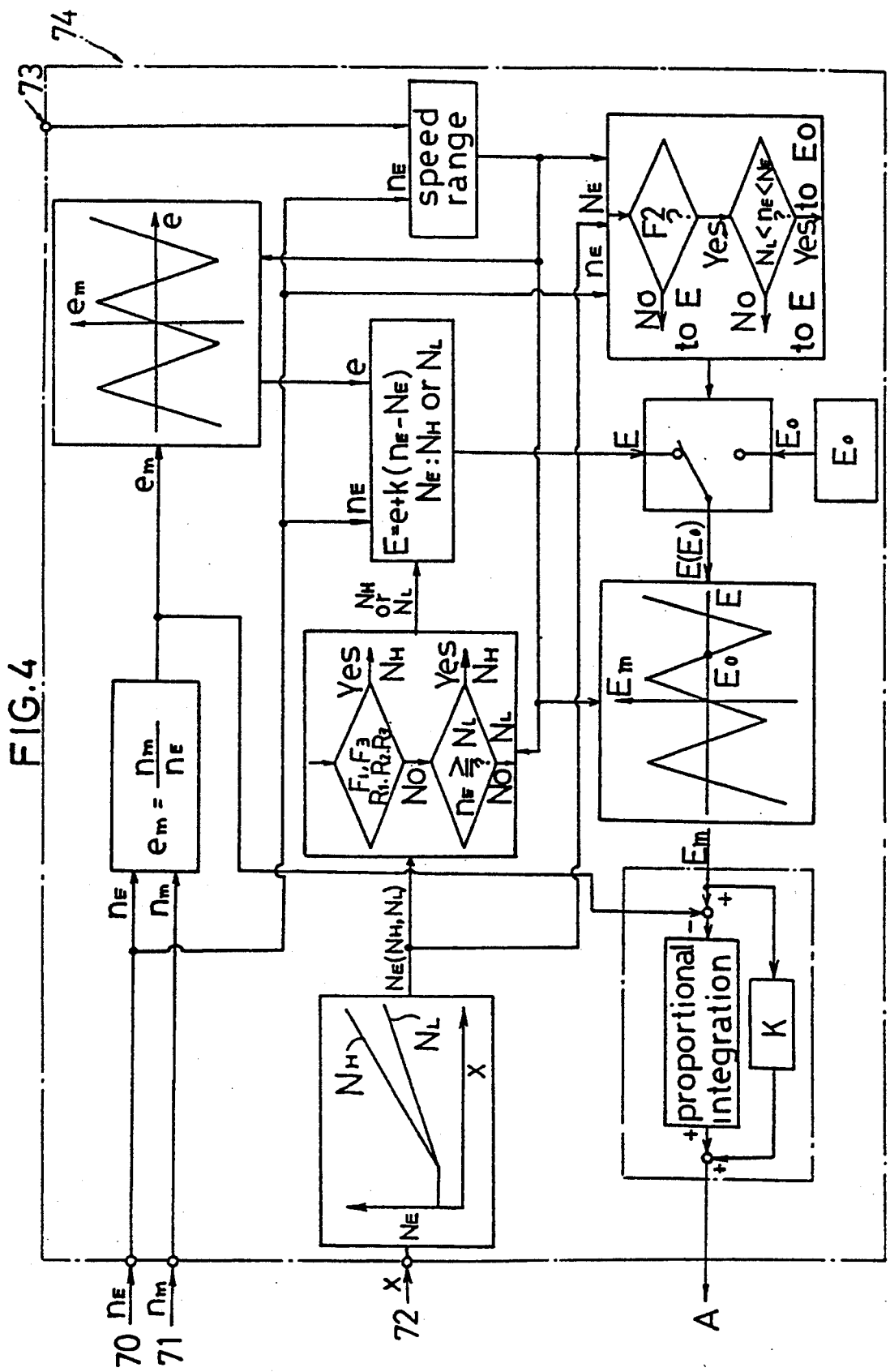

With reference now to FIG. 4, the arithmetic operation in the controller section 74 will be explained.

In accordance with the throttle position signal from the throttle position detector 72, the engine revolution speeds $N_H$, $N_L$ to be used as the target engine revolution speed $N_E$ of the engine 21 for the throttle position X are firstly obtained from calculation including conversion executed by the use of preliminarily set and stored characteristic functional equation or table. The characteristic functional equation or table is set based on the target engine revolution speed $N_E$ for the throttle position X, the speed $N_E$ being prepared from the characteristic curve of the torque for the engine revolution speed of the engine 21, according to the aforesaid revolution speed with high fuel efficiency and lower revolution speed. In other words, the above equation or table is set based on the characteristic curves of the respective engine revolution speeds $N_H$ and $N_L$ for the throttle position X. Either of the engine revolution speeds $N_H$ and $N_L$ thus obtained is selected as follows. This selection is carried out in accordance with the control state of the mechanical transmission unit 24 (i.e., a speed range selected) and the comparison between the engine revolution speed $N_H$ $N_L$ as obtained above and the actual engine revolution speed $n_E$, the unit 24 being controlled through the shift valve 75 on the basis of the actual engine revolution speed $n_E$ instructed by the engine revolution speed signal from the engine revolution speed detector 70 as well as the lever position FNR instructed by the lever position signal from the lever position detector 73.

i) when the speed range selected is 3rd forward speed F3, 1st reverse speed R1, 2nd reverse speed R2 or 3rd reverse speed R3, or when the speed range selected is 2nd forward speed F2 and the actual engine revolution speed $n_E$ is equal to the engine revolution speed $N_H$ or more:

→engine revolution speed $N_H$ ii) when the speed range selected is 1st forward speed F1 or when the speed range selected is 2nd forward speed F2 and the actual engine revolution speed $N_E$ is equal to or less than the engine revolution speed $N_L$:
→engine revolution speed $N_L$
iii) other cases:
→engine revolution speed $N_L$ In the meantime, the actual motor speed ratio $e_m$ (=$n_m/n_E$), which is the ratio of the actual motor revolution speed $n_m$ to the actual engine revolution speed $n_E$, is calculated from the actual engine revolution speed $n_E$ and the actual motor revolution speed $n_m$ which has been detected by the motor revolution speed detector 71. Then, the actual motor speed ratio $e_m$ thus obtained is converted using the preset and stored characteristic functional equation $e=f(e_m)$ or table in accordance with the control state (speed range) of the mechanical transmission unit 24, whereby the actual revolution speed ratio e is obtained. This characteristic functional equation $e=f(e_m)$ or table is represented by the same characteristic curve as shown in FIG. 3, and is set in accordance with the characteristic curve of the actual motor speed ratio $e_m$ for the actual revolution speed ratio e.

The target revolution speed ratio E is obtained from either the engine revolution speed $N_H$ or the engine revolution speed $N_L$ that has been selected as the target engine revolution speed $N_E$ as described above; the actual revolution speed ratio e; and the actual engine revolution speed $n_E$, using the following equation.

$$E = e + k(n_E - N_E) \quad (1)$$

where k is a coefficient the unit of which is 1/rpm.

When the mechanical transmission unit 24 is not in 2nd forward speed F2, or when the mechanical transmission unit 24 is in 2nd forward speed F2 and the actual revolution speed $n_E$ is out of the range of the target engine revolution speed $N_E$ to the engine revolution speed $N_L$, the aforesaid target revolution speed ratio E is converted, like the above case, using the preset and stored characteristic functional equation $E_m = F(E)$ or table in accordance with the control state (speed range) of the mechanical transmission unit 24, whereby the target motor speed ratio $E_m$ is obtained. The characteristic functional equation $Em=f(E)$ or table is also represented by the same characteristic curve as shown in FIG. 3 and is set in accordance with the characteristic curve of the target motor speed ratio $E_m$ for the target revolution speed ratio E. From the target motor speed ratio $E_m$ thus obtained and the actual motor speed ratio $e_m$, the operating amount A is obtained, the operating amount A being the sum of the feed forward amount $KE_m$ (K: feed forward coefficient) proportional to the target motor speed ratio $E_m$ and the proportional elements and integral elements of the deviation (=$E_m - e_m$) of the actual motor speed ratio $e_m$ with respect to the target motor speed ratio $E_m$. The operating amount A is supplied, in the form of an angle control signal, to the change-angle valves 76 and 77.

Thus, the actual motor speed ratio $e_m$ is controlled by the target motor speed ratio $E_m$, and the actual revolution speed ratio e is controlled by the target revolution speed ratio E so that the actual engine revolution speed $n_E$ is made coincident with either of the engine revolution speeds $N_H$ and $N_L$ that is selected as the target engine revolution speed $N_E$ for the throttle position X of the engine throttle.

When the mechanical transmission unit 24 is in 2nd forward speed F2 and the actual engine revolution speed $n_E$ falls in the range of the target engine revolution speed $N_E$ (i.e., $N_H$ or $N_L$) to the engine revolution speed $N_L$, the target revolution speed ratio $E_0$ corresponding to the motor speed ratio of zero that has been preset and achieves high efficiency in the transmission mechanism for a hydrostatic-mechanical power transmission system is converted using the characteristic functional equation $E_m = f(E_0)$ or table to obtain the target motor speed ratio $E_m$. From the target motor speed ratio $E_m$ thus obtained and the actual motor speed ratio $e_m$, the operating amount A is likewise obtained to be supplied to the change-angle valves 76 and 77 as an angle control signal. Since the actual motor speed ratio $e_m$ is accordingly controlled to be maintained at the target motor speed ratio $E_m$ of zero, the One-Point Adaptive Control, in which the actual engine revolution speed $n_E$ is controlled to be coincident with the target engine revolution speed $N_E$, is no longer performed, and therefore the actual engine revolution speed $n_E$ varies with a change in loads.

Figure 5:
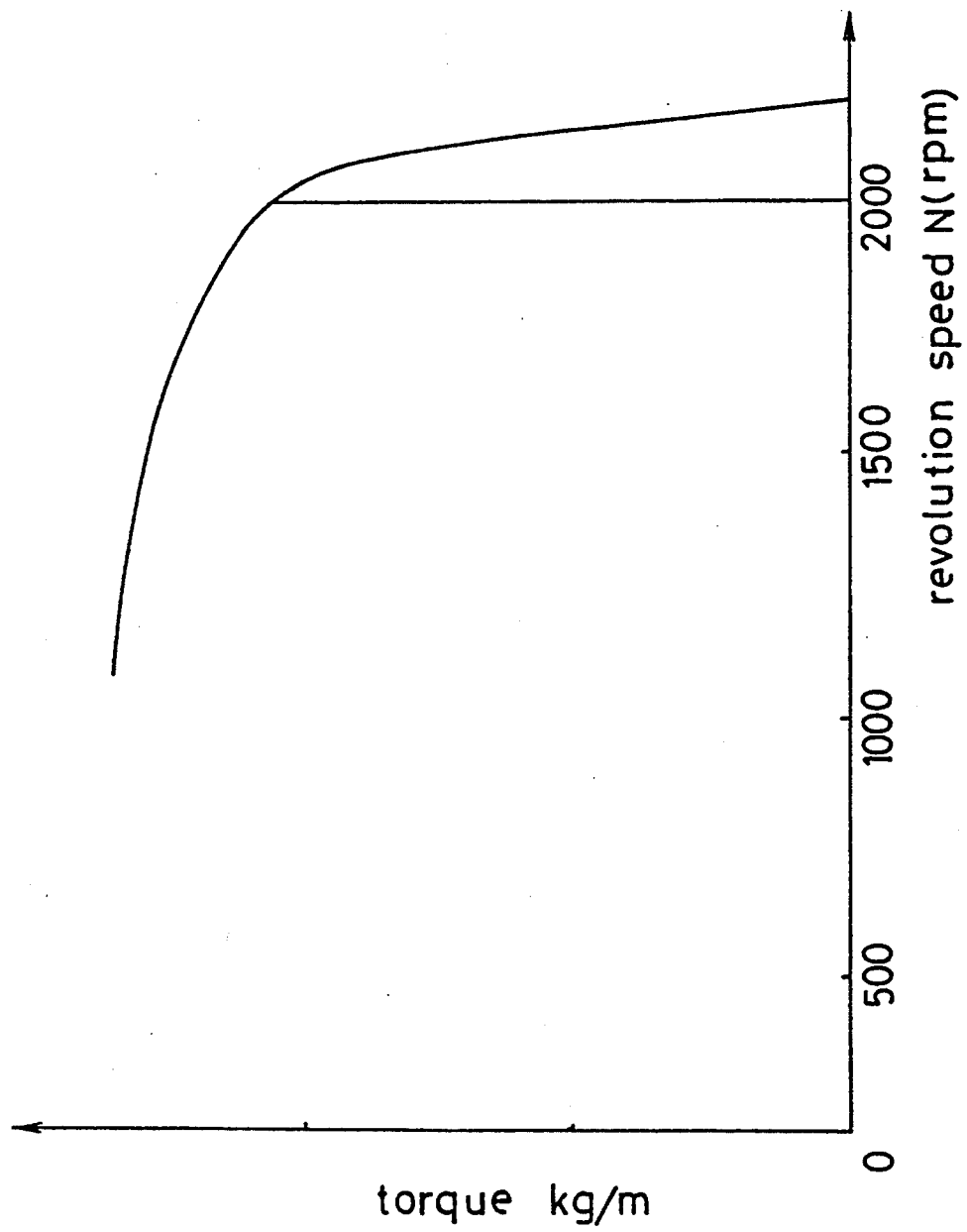
Figure 6:
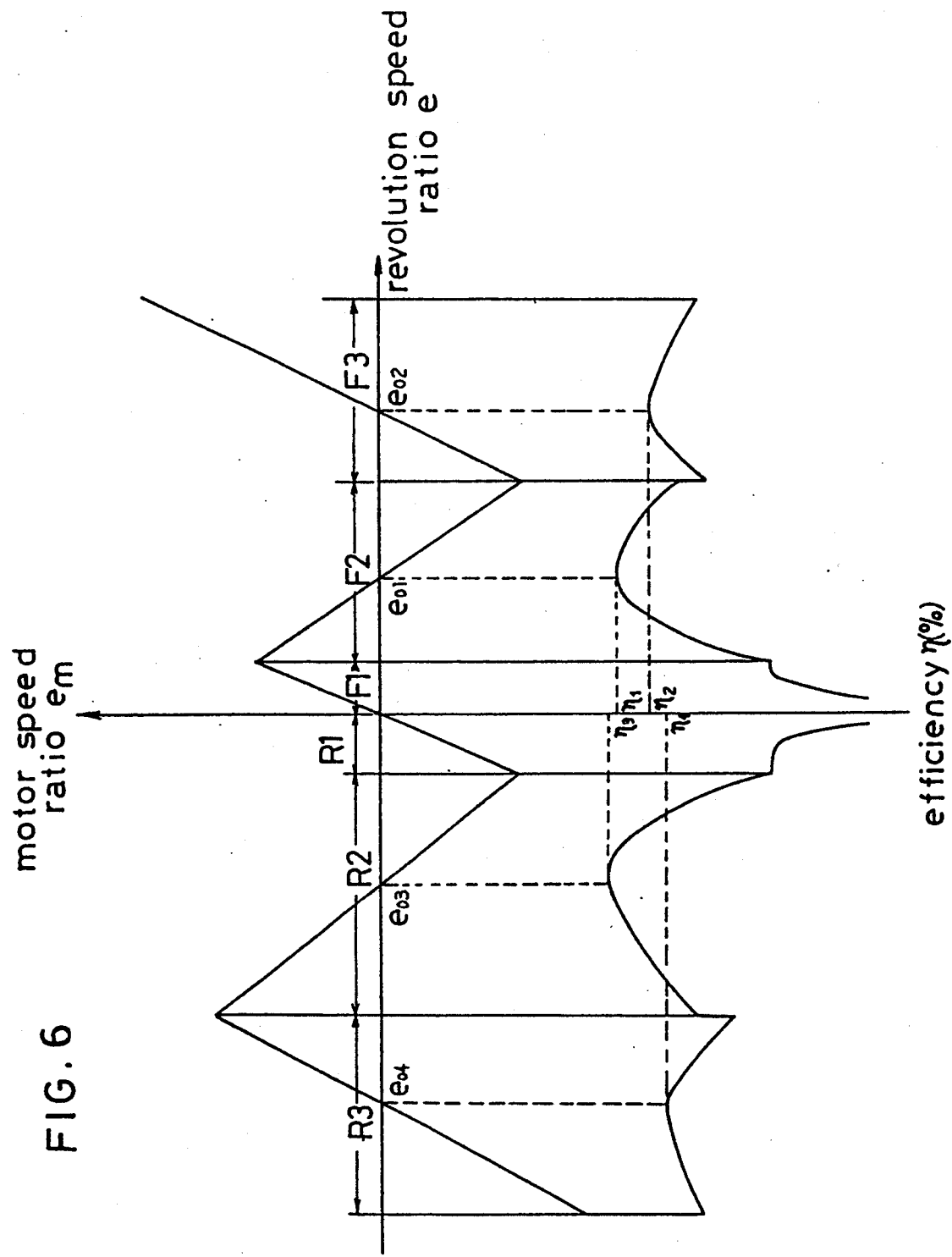

In the case where the engine 21 whose performance is shown in FIG. 5 is employed in combination with a hydrostatic-mechanical power transmission system whose performance in 2nd forward speed F2 is shown in FIG. 6, when a decrease in the actual engine revolution speed $n_E$ due to loads is allowed to be in the range from 2,000 rpm ($N_H$) to 1,600 rpm ($N_L$), tractive performance shown in FIG. 7 can be achieved. The dotted line in FIG. 7 represents the conventional case where transmission is performed with the One-Point Adaptive Control Method only.

According to the above embodiment, in order to control the angle of the displacement setting variable-angle swash plate 50a of the variable displacement pump 50 and the angle of the displacement setting variable-angle swash plate 53a of the variable displacement motor 53, an angle control signal corresponding to the target motor speed ratio $E_m$ is generated on the basis of the feed forward amount $KE_m$ proportional to the target motor speed ratio $E_m$, by using the motor speed ratio (described by the following equation [Eq.2]) which is proportional to the displacement ratio of the variable displacement pump 50 to the variable displacement motor 53, so that faster response can be achieved.

$$e_m = n_m/n_E = q_p/q_m \times 1/\rho \times \eta_p \times \eta_m, \quad [\text{Eq.2}]$$

where $q_p$: displacement of the variable displacement pump 50

$q_m$: displacement of the variable displacement motor 53

$\eta_p$: volume efficiency of the variable displacement pump 50

$\eta_m$: volume efficiency of the variable displacement motor 53

$\rho$: reduction gear ratio from the engine 21 to the variable displacement pump 50

Since proportional integration control is performed on the deviation (=$E_m - e_m$), control with better convergence to the target engine revolution speed $N_E$ can be achieved. Further, when the actual revolution speed $n_E$ is equal to the target engine revolution speed $N_E$, the target revolution speed ratio E obtained from the equation [Eq.1] is equal to the actual revolution speed ratio e, and therefore the actual engine revolution speed $n_E$ can be steadily kept to be the target engine revolution speed $N_E$.

In the above embodiment, the tractive performance is so improved that the engine revolution speed vary with a change in loads only when the transmission is in 2nd forward speed F2. It is to be understood that it may be varied with a change in loads when the transmission is in 3rd forward speed F3 and other speed ranges. The target motor speed ratio $E_m$ is set to zero in the embodiment, but a positive or negative value approximate to zero may be used, thereby achieving superior stability in the control operation although the tractive performance may deteriorate more or less.

Further, the equation [Eq.1] is used for obtaining the target revolution speed ratio E in this embodiment, but the following equation [Eq.3] may be used.

$$E = e \times n_E \qquad [\text{Eq.3}]$$

It is also possible to substitute the preceding target revolution speed ratio E' in the equation: $E = E' + k(n_E - N_E)$ or the following equation [Eq.4] in order to obtain the target revolution speed ratio E.

$$E = e' \times n_E/N_E \qquad [\text{Eq.4}]$$

In this case, there is no need to obtain the actual revolution speed ratio e for obtaining the target revolution speed ratio E.

In the above embodiment, the actual motor speed ratio $e_m$ is obtained directly from the ratio of motor revolution speed to engine revolution speed, but it is possible to obtain it from the ratio of output shaft revolution speed to input shaft revolution speed in consideration of the reduction gear ratio for the torque of the engine 21 and other factors, detecting the revolution speeds of the input shaft 23 and the output shaft 26. Alternatively, it is possible to obtain the actual motor speed ratio $e_m$ from the ratio of motor revolution speed to input shaft revolution speed, detecting the revolution speeds of the input shaft 23 and the output shaft 54 of the variable displacement motor 53. In the above cases, it is possible to obtain the target motor speed ratio $E_m$ through the following calculation: firstly, the target revolution speed of the input shaft 23 for the throttle position X indicated by the throttle position signal from the throttle position detector 72 is obtained; the actual motor speed ratio $e_m$ is converted into the ratio of the revolution speed of the input shaft 23 to the revolution speed of the output shaft 26; and then the target ratio of the revolution speed of the output shaft 26 to the revolution speed of the input shaft 23 is obtained.

Further, the actual motor speed ratio may be obtained from the ratio of output shaft revolution speed to engine revolution speed or the ratio of motor revolution speed to output shaft revolution speed, taking the reduction gear ratio for the torque of the engine 21 and other factors into account.

According to the operating amount A, the angles of the displacement setting variable-angle swash plate 50a of the variable displacement pump 50 and the displacement setting variable-angle swash plate 53a of the variable displacement motor 53 are controlled through the change-angle valves 76 and 77 in the embodiment, but either one of the angles of the displacement setting variable-angle swash plates 50a and 53a may be controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission and control mechanism for a hydrostatic-mechanical power transmission system, provided with a mechanical transmission unit having an input shaft connectable to an engine, said input shaft driving said mechanical transmission unit, a hydrostatic transmission unit connectable to and driven by the input shaft and including a pump and a motor each having a displacement setting swash plate, at least either of the displacement setting swash plates being variable in angle, and a differential unit for connecting an output shaft to the mechanical transmission unit and the hydrostatic transmission unit to drive the output shaft, comprising:

(a) means for setting a predetermined revolution speed range for the engine defined by a low revolution speed which is a lower limit and a high revolution speed which is an upper limit;

(b) revolution speed range sensing means for sensing whether an actual engine revolution speed is above, below or within the predetermined revolution speed range;

(c) target engine revolution speed setting means, responsive to said revolution speed range sensing means, for setting a target engine revolution speed at the low revolution speed when the actual engine revolution speed as sensed by the sensing means is below the low revolution speed and for setting the target engine revolution speed at the high revolution speed when the actual engine revolution speed is above the high revolution speed;

(d) target motor speed ratio setting means, responsive to said revolution speed range sensing means, for setting to zero or a value approximate to zero a target motor speed ratio that is a target value for the ratio of the revolution speed of the motor in the hydrostatic transmission unit to the actual engine revolution speed, when the revolution speed range sensing means senses that the actual engine revolution speed is within the predetermined revolution speed range; and (e) swash plate angle control means for controlling at least either of the angles of the displacement setting swash plates according to the target engine revolution speed set by the target engine revolution speed setting means when the actual engine revolution speed is outside the range or according to the target motor speed ratio set by the target motor speed ratio setting means when the actual engine revolution speed is within the range whereby the mechanism compensates for changes in the actual engine revolution speed due to changes in load so that the target engine revolution speed is at the low revolution speed when the actual revolution speed is below the range, so that the target motor speed ratio is at zero or a value approximate to zero when the actual engine revolution speed is within the range and so that the target engine revolution speed is at the high revolution speed when the actual engine revolution speed is above the high revolution speed.

2. The transmission and control mechanism for a hydrostatic-mechanical power transmission system as claimed in claim 1, wherein said setting means sets the low revolution speed equal to the lower limit of revolution speed at which the engine can normally operate.

3. The transmission and control mechanism for a hydrostatic-mechanical power transmission system as claimed in claim 1 or 2, wherein said mechanical transmission unit comprises a transmission providing a plurality of speed ranges, and the target motor speed ratio setting means operates to set the target motor speed ratio to zero or a value approximate to zero when the transmission is in a second forward speed.

4. The transmission and control mechanism for a hydrostatic-mechanical power transmission system as claimed in claim 1, wherein said target motor speed ratio setting means comprises:
(a) throttle position detecting means for detecting the position of a throttle;
(b) target engine revolution speed calculating means for calculating the target engine revolution speed, based on the detected throttle position;
(c) motor speed ratio-revolution speed ratio converting means for converting an actual motor speed ratio into an actual revolution speed ratio, the actual motor speed ratio being the ratio of the actual motor revolution speed to an actual engine revolution speed, and the actual revolution speed ratio being the ratio of the revolution speed of the output shaft to the engine revolution speed;
(d) target revolution speed ratio calculating means for calculating a target revolution speed ratio that is a target value for the ratio of the revolution speed of the output shaft to the engine revolution speed, wherein the target revolution speed ratio is obtained from actual engine revolution speed, the target engine revolution speed obtained by the target engine revolution speed calculating means and the actual revolution speed ratio obtained from the conversion by the motor speed ration-revolution speed ratio converting means; and
(e) target revolution speed ratio-target motor speed ratio converting means for converting the target revolution speed ratio calculated by the target revolution speed ratio calculating means into the target motor speed ratio.

5. The transmission and control mechanism for a hydrostatic-mechanical power transmission system as claimed in claim 4, wherein the conversion executed by said motor speed ratio-revolution speed ratio converting means is based on:

$$e = f(e_m)$$

where e is the actual revolution speed ratio and $e_m$ is the actual motor speed ratio.

6. The transmission and control mechanism for a hydrostatic-mechanical power transmission system as claimed in claim 4, wherein the calculation executed by said target revolution speed ratio calculating means is based on:

$$E = e + k(n - N)$$

where E is the target revolution speed ratio, e is the actual revolution speed ratio, n is the actual engine revolution speed, N is the target engine revolution speed and k is a coefficient.

7. The transmission and control mechanism for a hydrostatic-mechanical power transmission system as claimed in claim 4, wherein the calculation executed by said target revolution speed ratio calculating means is based on:

$$E = e \times n/N$$

where E is the target revolution speed ratio, e is the actual revolution speed ratio, n is the actual engine revolution speed and N is the target engine revolution speed.

8. The transmission and control mechanism for a hydrostatic-mechanical power transmission system as claimed in claim 1, wherein said target motor speed ratio setting means comprises:
(a) throttle position detecting means for detecting the position of a throttle;
(b) target engine revolution speed calculating means for calculating the target engine revolution speed, based on the detected throttle position;
(c) target revolution speed ratio calculating means for calculating a target revolution speed ratio that is a target value for the ratio of the revolution speed of the output shaft to the engine revolution speed, wherein the target revolution speed ratio is obtained from the target engine revolution speed calculated by the target engine revolution speed calculating means, the actual engine revolution speed and a preceding target revolution speed ratio calculated prior to said target revolution speed ratio; and
(d) target revolution speed ratio-target motor speed ratio converting means for converting the target revolution speed ratio calculated by the target revolution speed ratio calculating means into the target motor speed ratio.

9. The transmission and control mechanism for a hydrostatic-mechanical power transmission system as claimed in claim 8, wherein the calculation executed by said target revolution speed ratio calculating means is based on:

$$E = E' + k(n - N)$$

where E is the target revolution speed ratio, E' is the preceding target revolution speed ratio, n is the actual engine revolution speed, N is the target engine revolution speed and k is a coefficient.

10. The transmission and control mechanism for a hydrostatic-mechanical power transmission system as claimed in claim 8, wherein the calculation executed by said target revolution speed ratio calculating means is based on:

$$E = E' \times n/N$$

where E is the target revolution speed ratio, E' is the preceding target revolution speed ratio, n is the actual engine revolution speed and N is the target engine revolution speed.

11. The transmission and control mechanism for a hydrostatic-mechanical power transmission system as claimed in claim 4 or 8, wherein the calculation of the target engine revolution speed executed by the target engine revolution speed calculating means is performed with a specified characteristic functional equation or table.

12. The transmission and control mechanism for a hydrostatic-mechanical power transmission system as claimed in claim 4 or 8, wherein the conversion executed by said target revolution speed ratio-target motor speed ratio converting means is based on:

$$E_m = f(E)$$

where $E_m$ is the target motor speed ratio and E is the target revolution speed ratio.

* * * * *